C. H. LANK.
WATER LEVEL BOILER GAGE.
APPLICATION FILED MAR. 16, 1918.
1,307,982.
Patented June 24, 1919.
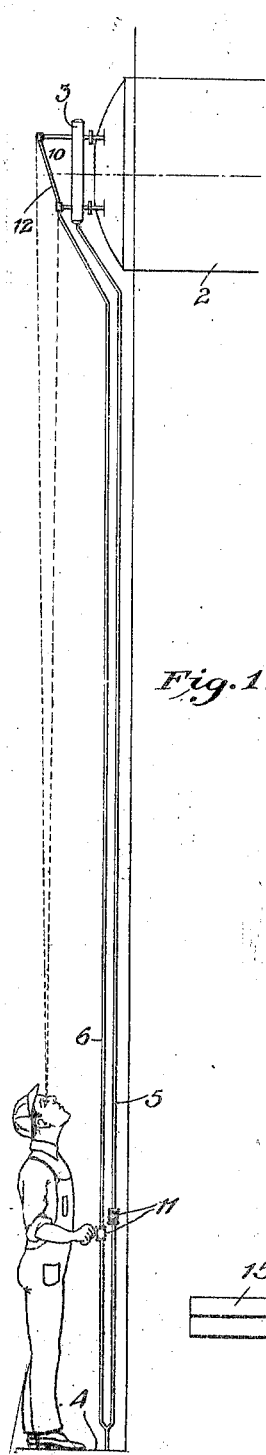
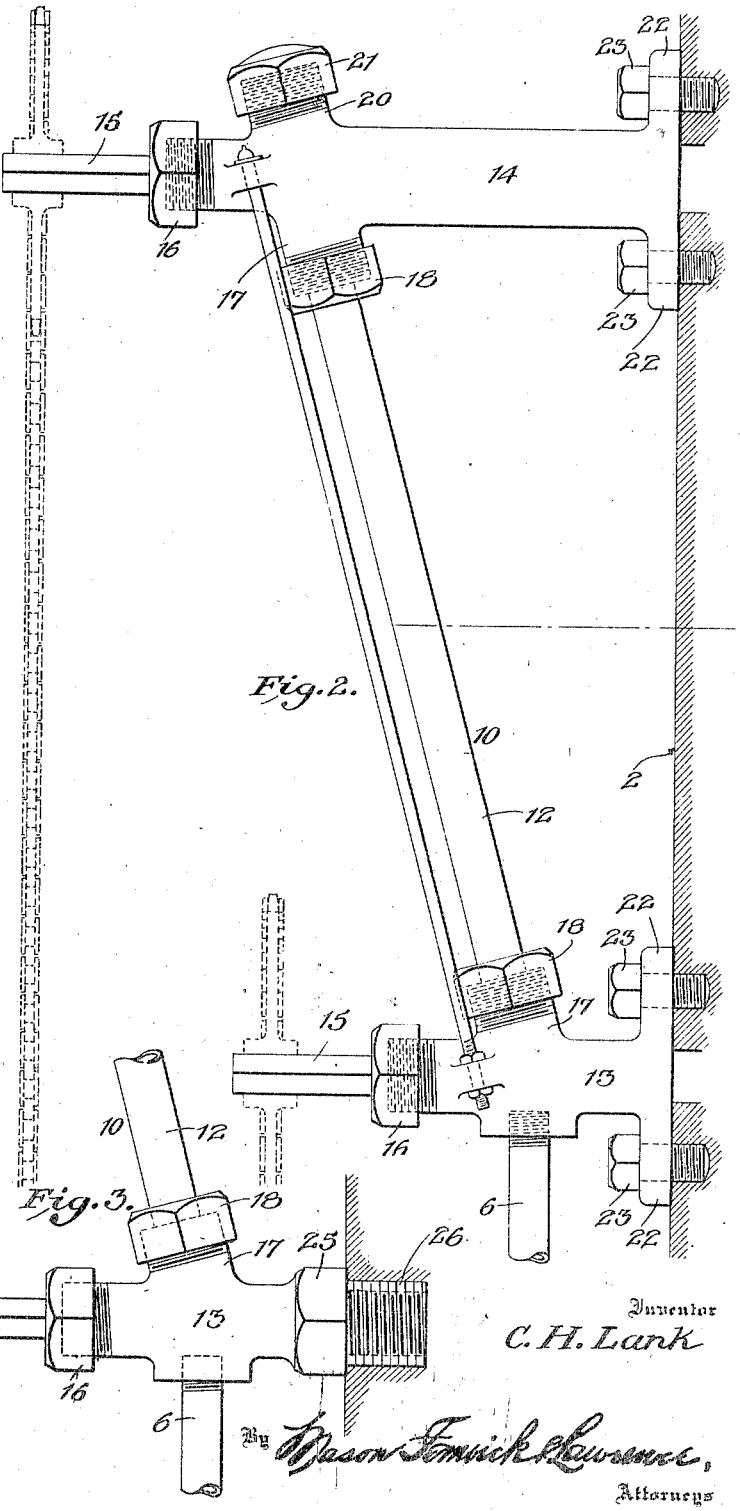
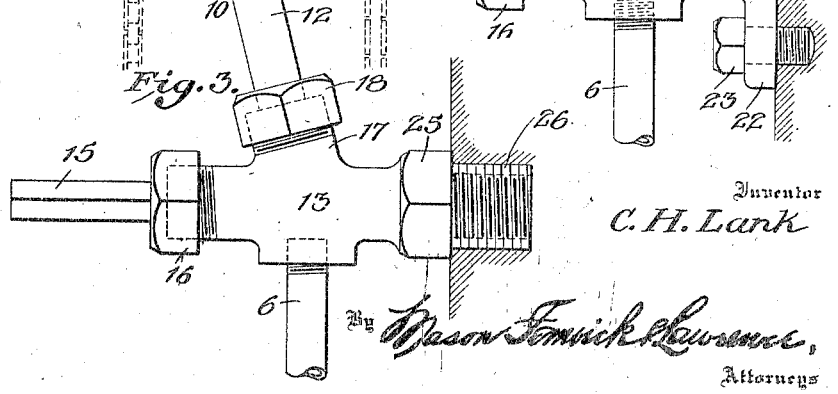
Inventor
C. H. Lank

UNITED STATES PATENT OFFICE.

CLARENCE H. LANK, OF PHILADELPHIA, PENNSYLVANIA.

WATER-LEVEL BOILER-GAGE.

1,307,982.      Specification of Letters Patent.    Patented June 24, 1919.

Application filed March 16, 1918.   Serial No. 222,946.

*To all whom it may concern:*

Be it known that I, CLARENCE H. LANK, a citizen of the United States of America, residing at Philadelphia, in the county of Philadelphia and State of Pennsylvania, have invented certain new and useful Improvements in Water-Level Boiler-Gages; and I do hereby declare the following to be a full, clear, and exact description of the invention, such as will enable others skilled in the art to which it appertains to make and use the same.

This invention relates to indicating apparatus and more especially to water level gages for steam boilers or other organizations in which it is desired to indicate the normal level of a liquid therein.

In modern practice, in the erection of boilers for the generation of steam, it is not unusual to put the water drum at a height of twenty feet, more or less, from the floor of the boiler room and when the water level gages are utilized in which the water level tube is set vertically, the attendant of the plant, who has to regulate the blow-down valves from a position approximately vertically below the vertical water leveling gage, is unable to quickly and reliably ascertain the true water level as shown by the gage owing to the very small projected length of the glass from a point of vision approximating a vertical line as to the water tube.

It is therefore one of the objects of the present invention to improve the method of setting the water level glass tube whereby the area of the tube in the line of vision from a point approximately below the gage will be so materially increased as to greatly facilitate and render more accurate the reading of the gage. It is another object of the invention to provide improvements in water level gages to facilitate the reading of the gage from a point approximate the vertical plane of the gage. Another object of the invention is to improve the construction of water gages so as to enable the ready attachment of the same to the receiver to so dispose the gage glass or tube as to expedite and render more accurate the reading of the gage.

With these and other objects in view, as will be rendered manifest to those versed in the art, the present invention consists of a method and means for facilitating the reading of water level gages as set forth more fully in the following specification with relation to the embodiments of the invention illustrated in the accompanying drawings in which—

Figure 1 is a diagrammatic elevation of a boiler plant equipped with one form of the invention.

Fig. 2 is a side elevation of one form of the gage.

Fig. 3 is a detail view of one of the fittings of the gage showing a modified form of connecting attachment for securing the fitting to the water column or other part of the receiver or drum.

I have shown my invention as practised and applied on an organization forming a portion of a boiler plant in which 2 is the boiler drum which may or may not be provided with a water column 3, the drum in this case being disposed at a considerable height above the boiler room floor 4 and in such installations, the water blow-down pipes are extended down as at 5 from the water column and as at 6 from the water gage indicated at 10, these pipes being provided with valves 11 disposed within reach of the attendant standing on the floor. When the ordinary water level gage is utilized, in which the glass tube stands vertically, if the operator assumes a position approximately vertically below the water gage to operate the valves 11, he can not accurately ascertain the level of the water in the gages owing to the minimum area of the gage glass presented to his view. To overcome this, my method of equipping a boiler or, in fact any other organization in which it is desirable to constantly indicate the normal water level, consists in arranging the water gage glass 12, Figs. 1 and 2 at an inclination from the vertical so that a considerable area of the glass 2 is projected to the view. This method of arrangement of the parts may be achieved in various ways and any suitable means may be utilized to hold the tube 12 in an inclined position.

In Fig. 2 of the drawings, the gage tube 12 is shown as arranged in lower and upper valvular fittings 13 and 14 respectively which consist of body portions of different lengths respectively, each being provided with a valve, the stem of which is indicated at 15, these passing through gland nuts 16, threaded on the outer ends of the fitting bodies. In this form of the invention each of the bodies of the fittings 13 and 14 are provided with transverse obliquely disposed branches or nipples 17 which may be externally threaded to receive packing nuts 18 through which are passed the glass tube 12, the difference in the lengths of the lower and upper fittings causing the tube to be tilted forwardly at its upper end from the lower fitting and thus presents, from a vertical view beneath, a considerable area of the tube. The mounting or dismounting of the tube 12 may be facilitated by providing on the opposite side of fitting 14 from nipple 17 a similarly inclined branch 20 through which the tube may be passed, this branch being closed by a cap nut 21.

Obviously, the fittings 13 and 14 may be connected to the adjacent part of the boiler or other organization in diverse ways, for instance, as shown in Fig. 2 the fittings may be provided with flanges 22 through which may be passed bolts 23 or if desired, another form of means may be utilized as shown in Fig. 3 in which the rear ends of the fittings are provided with a wrench-receiving or polygonal portion 25 beyond which extends a threaded portion 26 which may be screwed into the boiler part.

It is understood that variations may be resorted to in the construction, design, organization and combination of the parts within the spirit of my invention and the amended claims.

The angular inclination of the glass gage tube 12 not only provides for the ready and accurate observation of the level of the water in the boiler, but moreover the angular inclination of the branch or glass tube socket 17 of the lower fitting 13 forms an obtuse angle between the axis of the branch 17 and the axis of the fitting 13 at the right hand end of the fitting, this obtuse angle materially reducing the resistance to the flow of water produced by surging in the boiler and from other well known causes and decreases very largely the tendency of the lower fitting to be clogged or choked as so commonly happens when the gage glass is set perpendicularly to the lower fitting.

Again this invention shows valve stems 15 of independent valves in the upper and lower fittings 14 and 13, and on the stems there may be arranged any suitable gearing shown in dotted lines as sprocket wheel and chain for each valve, the chains in practice extending down to a point within convenient reach of the operator so that he may close either of the valves by its stem 15 independent of the other to render it possible to separately test the fittings 13 and 14, so that when one of the valves is closed the pressure in the boiler will blow down through the open fitting and into the blow-down tube 6 making it certain that both of the fittings are freely open by proper test. This is of importance, because when the fittings are located high above the station of the operator, and, as ordinarily are both connected at their valves by a unitary operating device, then when the operator opens the blow-down valve in the pipe 6 he is uninformed as to which of the fittings 13 or 14 may be open or closed, because they are not separately tested.

What is claimed is:

1. The combination with a boiler of the type having its normal water level overhead or above the floor of the boiler, of upper and lower gage fittings each with a cut-off valve independently operable from the other so that either of the fittings can be separately blown to test, and each having an oblique gage tube branch, and a tube therein, whereby when the whole is applied to a boiler with the fittings respectively above and below the boiler level, the level line is plainly visible from substantially any point in front of the boiler.

2. A water level gage comprising upper and lower fittings to be respectively attached to a receiver above and below the normal water level, the lower fitting having a tube socket at an obtuse angle for the blow-down of water from the tube so that the choking tendency of the lower fitting is reduced, and the upper fitting having a tube socket alining with the lower socket, and a gage tube held in said sockets in an inclined position when the gage is applied to the boiler.

3. A water level gage comprising upper and lower fittings to be respectively attached to a receiver above and below the normal water level, the lower fitting having a tube socket at an obtuse angle for the blow-down of water from the tube so that the choking tendency of the lower fitting is reduced, and the upper fitting having a tube socket alining with the lower socket, a gage tube held in said sockets in an inclined position when the gage is applied to the boiler, a blow-down pipe attached to the lower fitting, and separate valves for blowing off each fitting independent of the other through the blow-down pipe.

4. A water level gage for boilers, comprising an upper fitting adapted for attachment to the boiler, said fitting having a valve and provided at opposite sides with oblique branches axially alined; and a lower fitting adapted for connection to the boiler construction and having a valve and oblique branch alining with the branches of the upper fitting when the fittings are applied to the boiler, a removable gage tube insertible into the alined branches therefor on the fittings, means for packing the tube at its ends on the fittings, and a closure for the upper branch of the top fitting.

In testimony whereof I affix my signature.

CLARENCE H. LANK.